UNITED STATES PATENT OFFICE.

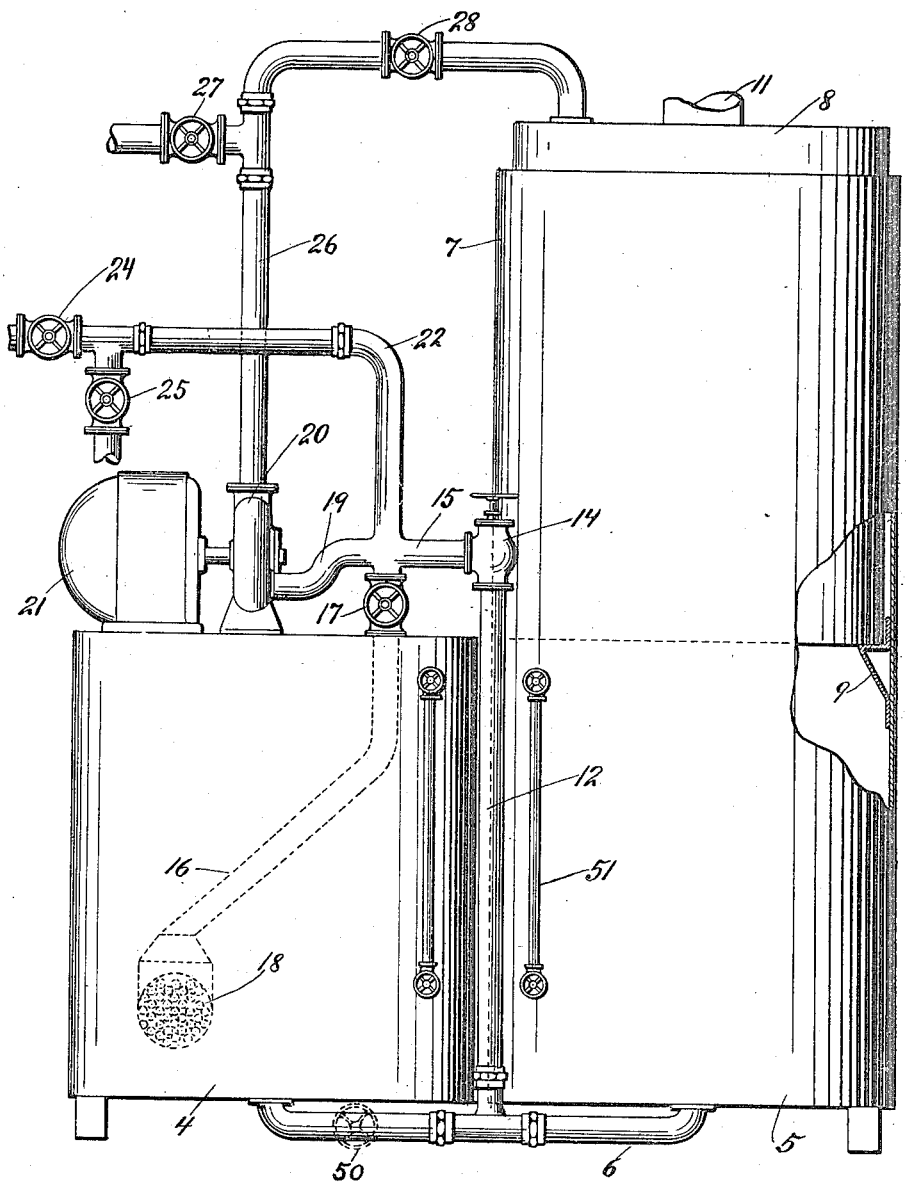

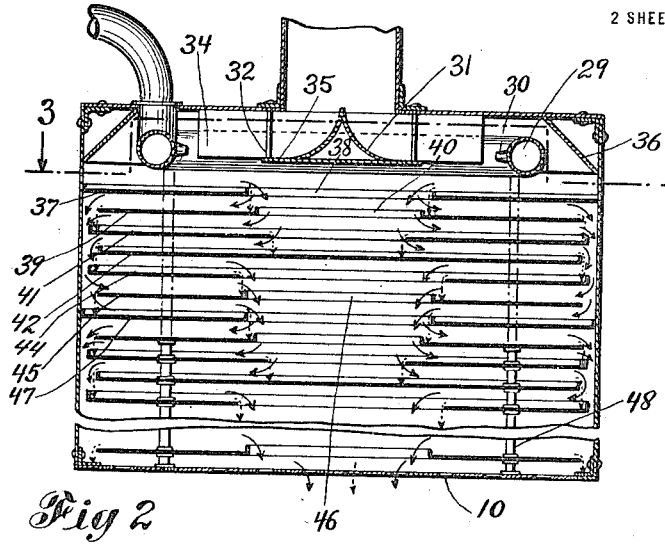
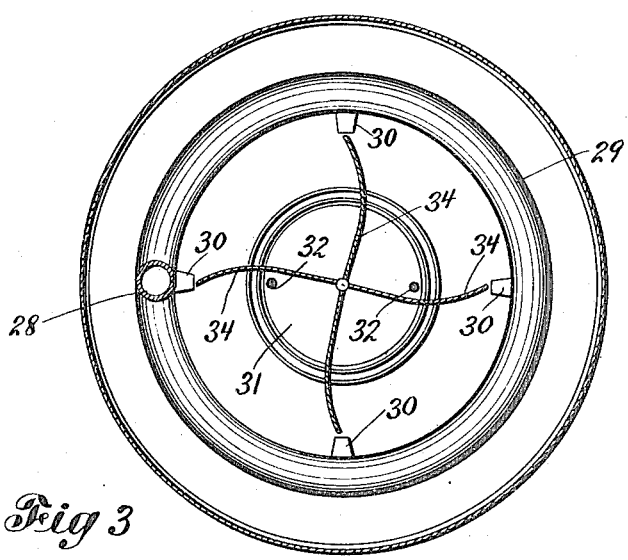

ALFRED E. DAVIDSON, OF NEWARK, NEW JERSEY.

APPARATUS FOR TREATING AIR AND THE LIKE.

1,277,393.  Specification of Letters Patent.  Patented Sept. 3, 1918.

Application filed April 20, 1914.  Serial No. 833,069.

*To all whom it may concern:*

Be it known that I, ALFRED E. DAVIDSON, a subject of the King of England, residing at Newark, in the county of Essex and State of New Jersey, have invented certain new and useful Improvements in Apparatus for Treating Air and the like, of which the following is a specification.

This invention relates to an apparatus for treating air or the like, and has particular reference to the treatment of the air in submarines or other inclosures so as to counteract the vitiation of such air under normal conditions of use, so that the air is maintained in a breathable condition during long periods when it is not possible to renew the supply of air.

The invention contemplates the forced passage of the air over and into intimate contact with a solution of sodium or potassium hydrate or other chemical whereby the carbon dioxid, chlorin, free sulfuric acid, and other unbreathable matter generated in the submarine or other inclosure, may be absorbed. The invention contemplates a wide range of applications aside from submarines, as for instance, in the fermenting rooms of breweries, in cold storage plants, in theaters, etc., but it has a peculiar value in connection with submarines because in cases of accident, where the submarine is submerged for long periods of time before it can be raised again, and because the air in the submarine cannot be renewed under such circumstances, the vitiation of the atmosphere which inevitably takes place by the generation of carbon dioxid on the part of the crew, the generation of chlorin from the distintegration of the sea water in contact with the electrical apparatus and of free sulfuric acid given up by the storage batteries, soon renders the atmosphere absolutely unbreathable and results in the suffocation of the crew. It is, of course, common practice to carry tanks of oxygen, but this in itself does not avail so long as the carbon dioxid and other impurities are in the air in ever-increasing quantities. It has been proposed to eliminate these impurities by absorption, but the relief afforded by the methods and apparatus heretofore employed has not been sufficient, and an enforced submersion of more than a few hours, on account of accident, has uniformly resulted in loss of life.

By my invention I aim to make the air in a submarine breathable and to extend the time within which, after an accident, the submarine may be raised with the possibility of finding the crew still alive.

The method which I have invented will be explained in connection with the following description of an apparatus which I have devised for the carrying out of the same, and the protection which I contemplate will appear from the claims.

In the accompanying drawings, in which I have shown a preferred form of apparatus, Figure 1 is an elevation, with parts broken away showing a system such as I have in mind; Fig. 2 is a vertical sectional view through the absorption chamber, and Fig. 3 is a view on the line 3—3 of Fig. 2.

Referring to the numerals on the drawings there is shown at 4 a reservoir adapted to contain a store of the solution of potassium hydrate or other chemical, and 5 indicates another reservoir communicating at its bottom by way of the pipe 6 with the bottom of the reservoir 4. The reservoir 5 has an upward circular extension indicated by the numeral 7, and a circular tank 8 is mounted within this extension 7 upon brackets 9, the walls of the tank 8 being spaced from the walls of the extension 7 so as to afford an annular passageway between them. The bottom of the tank 8 is perforated as indicated by the numeral 10 in Fig. 2. At the top of the tank 8 there is an inlet 11 for the ingress of air, and the pipe 6 is provided with a vertical branch 12, connected, through a valve 14, with a pipe 15. The pipe 15 has three branches, one comprising a conduit 16 controlled by a valve 17 and leading through the top and into the interior of the reservoir 4. This conduit 16 extends to a point adjacent the bottom of the reservoir 4, and its end is preferably screened as indicated at 18. The pipe 15 has another branch 19, which communicates with the inlet end of a centrifugal pump 20, the latter being driven by a motor 21. The third branch of the pipe 15 is indicated at 22, and this pipe 22 is intended to connect with sea water by means of the valved branch 24, or with a supply of ready mixed solution of potassium hydrate or the like, by means of the valve-controlled branch 25. From the discharge end of the pump 20 extends a conduit 26, which has a valve-controlled branch 27 leading to a place of discharge, and another valve-controlled branch 28 communicating with the top of the tank 8. The branch 28 within the tank 8 communicates with a tubular ring 29, which has a plurality of inwardly directed discharge spouts 30. Immediately below the air inlet 11 there is a conical deflector 31, any horizontal section of which is preferably circular. This conical deflector is suspended from the top of the tank 8 by means of bolts 32, and a plurality of vanes 34 is held in radial relation to the conical deflector 31, between the base 35 thereof and the top of the tank 8. It will be evident that air drawn in through the inlet 11 will be directed against the side walls of the tank 8, by reason of the presence of the conical deflector 31 and of the several vanes 34. At the same time, assuming that the chemical solution is being discharged through the pipe 28 and tubular ring 29, this solution will be driven inwardly, and there will be a fairly intimate contact between the oppositely moving streams of air and solution. It is intended that the air directed against the sides of the tank shall be given a downward direction, and to that end I provide an annular deflector 36 which directs the air downwardly and toward the center of the tank. Below the distributing ring 29 and the deflector cone 31 the tank is occupied by a nest of superposed plates or disks 37 of peculiar characteristics and relations. The uppermost one of these disks extends entirely across the tank, making a tight joint with the side walls thereof, and it is provided centrally with an aperture defined by an upwardly extending flange 38. Below this disk 37 there is another disk 39, the outer edges of which are spaced from the side wall of the tank, and this disk 39 is provided with an upwardly extending flange 40, defining a center aperture smaller than that of the disk 37; and since this disk, as well as all the other disks in the nest, are concentric, it follows that the flange 40 will be closer to the common center than is the flange 38. It will be understood that the outer edge of the disk 39 is not flanged at all. Below the disk 39 again is a disk 41 which has its outer edge upwardly flanged and somewhat closer to the side walls of the tank 8 than is the outer edge of the disk 39. This disk 41 is also provided with a central opening, smaller than that defined by the flange 40 of the disk 39, but the central aperture of the disk 41 is not flanged. Below the disk 41 there is another disk 42, which has no opening at all, and which has its outer edge flanged and spaced farther away from the side walls of the tank 8 than is the outer edge of the disk 41. Below the disk 42 there is a disk 44 having its outer edge flanged and slightly spaced away from the side walls of the tank 8 and having a large central aperture, which is however unflanged. Below the disk 44 is a disk 45 having its outer edge spaced farther away from the side walls of the tank 8 than is the outer edge of the disk 44, this outer edge being unflanged, and the disk having a central opening somewhat smaller than the opening of the disk 44 defined by an upwardly extending flange 46. Below the disk 45 is another disk 47, similar in all respects to the disk 37. Below the disk 47 is another series of disks similar in all respects to the disks 39, 41, 42, 44 and 45, respectively. All of these several disks are held vertically spaced apart and are secured in assembled relation as by means of bolts 48 extending through them, each bolt being secured to each of the disks through which it passes. It is believed that the operation of the device may now be understood.

Assuming that the reservoirs 4 and 5 are properly supplied with a solution of potassium hydrate or other chemical, the valve 14 is closed, the valve 17 opened, the valves 24 and 25 are closed, the valve 27 is closed and the valve 28 opened, whereupon the motor 21 is started, setting the pump 20 in operation. The solution from the reservoirs 4 and 5 is thereupon drawn up through the pipes 16 and 19, through the pump, and from the pipe 26 into the top of the tank 8, and by way of the distributing ring 29 and spouts 30 against the inner sides of the tank. The movement of the solution or the operation of a fan, causes an indraft of air through the opening 11, and as this air enters the top of the tank it is deflected by means of the deflectors 31 and 36 in a manner already described. The solution drops, most of it on to the disk 37, and some of it onto the disks 39, 41 and 42, but whichever disk a particular quantity of solution happens to fall upon, it must, in its further downward travel, pass over every disk below that on which it first strikes, as would be obvious from an inspection of the arrangement and flanging of the several disks, until it finally flows over the outer edges of the lowermost disk in the tank and thence out through the perforated bottom 10, from which it drops down again into the reservoir 5. In Fig. 2 I have indicated the path of travel of solution by means of dotted lines. The air drawn or forced into the tank and deflected by means of the deflectors 31 and 36 moves toward the center of the tank and downwardly and may pass between disks 37, 39, 41 and 42. Whichever of these routes the air takes it reaches the side walls of the tank and must then move in again toward the center by means of the spaces between disks 42, 44, 45 and 47. From the center again the air proceeds to the side walls of the tank by means of the passages between the disk 47 and the next three disks below it, and from the side walls of the tank again back to the center as before, and thence out through the perforated bottom of the tank along with the solution and then up through the annular space between the tank 8 and the surrounding casing 7, the air thus escaping from this space being now substantially freed from carbon dioxid and other impurities. If desired, there may be a valve 50 in the pipe 6 so as to cut off the reservoir 4. In that event, the reservoir 4 may be held as a reservoir and the supply of solution for the circulating system drawn directly from the reservoir 5 by means of the pipes 6, 12 and 15, the valve 14 being, of course, opened and the valve 17 closed. The level of solution in the reservoirs 4 and 5 is indicated by ordinary gage glasses 51.

When the solution in the connected reservoirs 4 and 5 has been circulated to such an extent that its usefulness is destroyed, it may be discharged from the system by way of the valved pipe 27. For that purpose the valve 28 will be closed, the valves 24 and 25 closed, and either or both the valves 14 and 17 opened. If it is desired, after such discharge, to take in fresh water for rinsing over the trays in the tank 8, this may be accomplished as follows: close the valve 25, open the valve 24, close the valves 14 and 17, close the valve 27 and open the valve 28. And if it is desired to take into the system fresh ready prepared solution, by way of the valved branch 25, this may be accomplished by opening the valve 25, closing the valve 24, closing the valves 14 and 17 and 27, and opening the valve 28, whereupon the fresh supply will be pumped into the top of the tray tank 8, whence it will find its way to the reservoirs 4 and 5.

It will be obvious that by means of the apparatus described both the solution and the air are circulated through the apparatus and brought into intimate and repeated contact, whereby an exchange is effected, the air giving up certain of its impurities, as aforesaid, to the solution. One of the essential features of the invention, therefore, is the continued circulation of the solution; another feature is to induce simultaneous circulation of air and the bringing of the air into contact with the solution while they are both so circulating, and another feature is in the tortuous path which is given to the circulating air and solution within the exchange or absorption tank, in causing the air and the solution to pass repeatedly from the center to the outer walls and back to the center again of the tank, in causing the solution to pass over everyone of the horizontal trays in succession, and in causing the air to pass over the solution on each tray and also through the drip that falls from tray to tray. It is to be understood that instead of depending upon the circulation of the solution alone to cause the indraft of air, I may positively draw the air into the exchange or absorption tank by means of a fan or the like; at any rate, I prefer that the movement of the air into the tank shall be positive. It will be understood also that the air to be purified is preferably led into the tank through a pipe 11, and this pipe should be of such length that its inlet end may be located at some point remote from the tank 8, in order to accomplish the best circulation. Furthermore, this pipe 11 may be flexible, so that its inlet end may be moved about from place to place, so as to draw in air from places where it might otherwise be pocketed and stagnant.

It is to be understood that there may be variations in the method which I have described, and that in respect of the apparatus disclosed materials, sizes, and relations of parts are unimportant, except as set forth in the claims. It is also to be understood that I do not limit myself to the purification of air, since the apparatus might, with proper changes, be employed for removing from any gas or gaseous compound the undesirable matters carried thereby or therewith.

I claim:

1. An apparatus for the purpose described comprising a solution reservoir, an exchange tank supported within and in spaced relation to the side wall of the reservoir, said exchange tank having an inlet opening in its top and an outlet opening in its bottom, both openings communicating with the atmosphere, and means for inducing a circulation of solution from the reservoir through the tank and back into the reservoir.

2. An apparatus of the kind described comprising a solution tank having an upward extension, an exchange tank supported in the upward extension and having its walls spaced from the side walls of the extension, the bottom of the exchange tank being perforated so as to communicate with the reservoir and with the space between the exchange tank and the walls of the extension, said tank having an air inlet at its top, means for forcing solution from the reservoir into the top of the tank, and means within the tank for causing the solution and air drawn into the top of the tank to pass repeatedly from the center to the outside walls of the tank and toward the bottom thereof.

3. An apparatus of the class described, comprising a fluid reservoir, an exchange tank arranged within the top and spaced from the wall thereof, a circulating means for forcing the fluid into the top of said exchange tank, an air inlet also in the top of said exchange tank, and means within the tank to direct the incoming air against the incoming fluid to cause the two to contact, and baffling plates arranged below said means, thereby giving the contacting circulating fluid and air a tortuous path during part of their circulation, an outlet in the bottom of said exchange tank to allow the fluid to return to the reservoir and the air escape through the space between the walls of the reservoir and the exchange tank.

4. An apparatus for the purpose described comprising a solution reservoir, an exchange tank having an opening in its top and an outlet opening in its bottom, both openings communicating with the atmosphere, a perforated distributing ring arranged within the exchange tank around the top opening and means for causing a circulation of solution from the reservoir to the distributing ring and through the exchange tank.

5. An apparatus for the purpose described comprising a solution reservoir, an exchange tank having a centrally arranged inlet opening in its top and an outlet opening in its bottom, both openings communicating with the atmosphere, means adjacent said top opening to laterally deflect the incoming air, a perforated distributing ring in communication with the reservoir arranged around the inlet opening to direct a spray of solution against the incoming air and means for causing a circulation of solution from the reservoir to the distributing ring and through the tank.

6. An apparatus for the purpose described comprising a solution reservoir, an exchange tank having a centrally arranged inlet opening in its top and an outlet opening in its bottom, both openings communicating with the atmosphere, means adjacent said top opening to laterally deflect the incoming air, a perforated distributing ring in communication with the reservoir arranged around the inlet opening to direct a spray of solution against the incoming air, a series of baffles arranged below the deflector to cause the air to take a tortuous passage through the tank and means for causing a circulation of solution from the reservoir to the distributing ring and through the tank.

7. An apparatus for the purpose described, comprising a solution reservoir, an exchange tank having an opening in its top and bottom, both openings communicating with the atmosphere, and means for inducing a circulation of solution from the reservoir through the tank and back to said reservoir.

8. An apparatus for the purpose described, comprising a solution reservoir, an exchange tank supported above the reservoir and provided with an opening in its top and bottom, both openings communicating with the atmosphere, and means for inducing a circulation of solution from the reservoir through the tank and back to the reservoir.

In testimony whereof I affix my signature in presence of two witnesses..

ALFRED E. DAVIDSON.

Witnesses:
MARY H. LEWIS,
H. VERONICA FITZPATRICK.

Copies of this patent may be obtained for five cents each, by addressing the "Commissioner of Patents, Washington, D. C."